(12) United States Patent
Jackson

(10) Patent No.: US 7,127,738 B1
(45) Date of Patent: Oct. 24, 2006

(54) LOCAL FIREWALL APPARATUS AND METHOD

(75) Inventor: Stephen S. Jackson, Chapel Hill, NC (US)

(73) Assignee: Nortel Networks Limited (CA)

( * ) Notice: Subject to any disclaimer, the term of this patent is extended or adjusted under 35 U.S.C. 154(b) by 879 days.

(21) Appl. No.: 09/691,549

(22) Filed: Oct. 18, 2000

(51) Int. Cl.
G06F 9/00 (2006.01)
H01R 13/66 (2006.01)

(52) U.S. Cl. .......................................... 726/11; 439/620

(58) Field of Classification Search ........ 713/150–154, 713/201, 300, 310, 340; 709/225, 229; 439/620; 380/52, 59; 340/310.01
See application file for complete search history.

(56) References Cited

U.S. PATENT DOCUMENTS

| | | | | |
|---|---|---|---|---|
| 5,148,144 A | * | 9/1992 | Sutterlin et al. | 340/310.01 |
| 5,406,260 A | | 4/1995 | Cummings et al. | 340/568 |
| 5,668,419 A | * | 9/1997 | Oktay | 307/126 |
| 5,729,204 A | * | 3/1998 | Fackler et al. | 340/2.4 |
| H001944 H | * | 2/2001 | Cheswick et al. | 713/201 |
| 6,185,680 B1 | * | 2/2001 | Shimbo et al. | 713/160 |
| 6,345,299 B1 | * | 2/2002 | Segal | 709/229 |
| 6,385,642 B1 | * | 5/2002 | Chlan et al. | 709/203 |
| 6,578,076 B1 | * | 6/2003 | Putzolu | 709/223 |
| 6,643,566 B1 | * | 11/2003 | Lehr et al. | 700/286 |
| 6,880,089 B1 | * | 4/2005 | Bommareddy et al. | 726/11 |
| 2002/0004828 A1 | * | 1/2002 | Davis et al. | 709/223 |

OTHER PUBLICATIONS

Stallings, W., Cryptography And Network Security, 1999, Prentice Hall, 2nd Edition, pp. 517-527.*
Siemens And PowerDsine Enter Strategic Collaboration to Deliver Benefits Promised by Powered-Ethernet Telephony Concep Apr. 2000.*

* cited by examiner

Primary Examiner—Gilberto Barrón, Jr.
Assistant Examiner—Minh Dinh
(74) Attorney, Agent, or Firm—McGuinness & Manaras LLP

(57) ABSTRACT

A firewall that may be used in a power integrated network having a plurality of computer systems is powered by the power integrated network. To that end, the firewall includes an input module that receives data addressed to a given computer system in the power integrated network, a security module for determining if the data received at the input module can be forwarded tot he given computer system, and a power module to power both the input module and the security module. The power module receives its power from the power integrated network.

6 Claims, 4 Drawing Sheets

LOCAL FIREWALL APPARATUS AND METHOD

FIELD OF THE INVENTION

The invention generally relates to computer network security and, more particularly, the invention relates to securing computer networks and computer systems with firewalls.

BACKGROUND OF THE INVENTION

Local area networks (e.g., intranets and other local networks) commonly require some level of security to prevent data access by unauthorized people. Such unauthorized people often are referred to as "hackers." Absent some security measure, a hacker can access a local area network without permission by the administrator of the network. For example, a hacker can illicitly copy secret data from such a network, or reconfigure such a network to malfunction.

Various security measures often are taken to prevent access by a hacker. Among those measures is use of a "firewall." As known in the art, a firewall is a hardware and/or software device that controls access to a given network. For example, a firewall may intercept all data received from a larger network (e.g., the Internet), and determine which data can pass through it to the network that it is protecting. Data access can be permitted based upon a variety of preconfigured policies, such as the type of transport protocol used by received data, or the origin of the data. A firewall thus acts as a filter to prevent unauthorized data from being transmitted to and/or being removed from its protected network.

Although useful in many instances, the security provided by a firewall can be breached. In such case, all computer systems in such protected networks consequently can be susceptible to being accessed and/or tampered with by a hacker.

SUMMARY OF THE INVENTION

In accordance with one aspect of the invention, a firewall that may be used in a power integrated network having a plurality of computer systems is powered by the power integrated network. To that end, the firewall includes an input module that receives data addressed to a given computer system in the power integrated network, a security module for determining if the data received at the input module can be forwarded to the given computer system, and a power module to power both the input module and the security module. The power module receives its power from the power integrated network.

In various embodiments, the power integrated network implements principles of Power Ethernet. Moreover, the power module may include a power converter that converts power received from the power integrated network into a power level that can be used by the security module and the input module. The firewall also may include an output module for forwarding the data to the given computer system. Of course, only data approved by the security module is forwarded to the given computer by the output module. The firewall further may include a policy server interface for communicating policy data with a policy server. The power integrated network generally includes at least two computer systems that are coupled with a cable that transmits both data and power.

In accordance with another aspect of the invention, a computer cable for communicating a first computer system with a second computer system in a power integrated network includes a firewall. In addition, the computer cable includes a data channel for transmitting data between the first computer system and the second computer system, and a power channel for transmitting power between the first computer system and the second computer system. The firewall is coupled with both the data channel and the power channel and thus, is energized by the power received from the power channel.

The data channel may include one or more wires. In a similar manner, the power channel may include one or more wires. The computer cable may include a first coupler for coupling one end of the computer cable to the first computer system, and a second coupler for coupling a second end of the computer cable to the second computer system. A containment layer (e.g., plastic) may circumscribe the data channel, firewall, and power channel.

In accordance with yet another aspect of the invention, a firewall for use in a self powering network may include program code for receiving data addressed to a given computer system in the network, program code for analyzing the received data to determine if the data can be forwarded to the given computer system, and a processor for executing the aforementioned program code. The processor is energized by the power integrated network.

In accordance with other aspects of the invention, a power integrated network coupled with a specified network includes a plurality of computer systems, a network firewall coupled between it and the specified network, and a local firewall coupled to one of the computer systems. The local firewall is powered by the power integrated network and prevents unauthorized access to the one computer system via the specified network. The local firewall prevents unauthorized access, however, to the one computer only.

Various embodiments of the power integrated network implement principles of Power Ethernet. In addition, the specified network may be a public network, such as the Internet.

In still other aspects of the invention, a method of securing a given computer system within a power integrated network receives power from the network, couples a local firewall to the given computer system, and uses the received power to energize the local firewall. The local firewall is configured to control access to the given computer system.

BRIEF DESCRIPTION OF THE DRAWINGS

The foregoing and advantages of the invention will be appreciated more fully from the following further description thereof with reference to the accompanying drawings wherein.

DESCRIPTION OF ILLUSTRATIVE EMBODIMENTS

In illustrative embodiments of the invention, a power integrated, local network (e.g., a local area network implementing Power Ethernet, discussed below) includes at least one computer system that has a local firewall in addition to, or instead of, a network firewall that protects the entire local network. The local firewall is energized by power received from the network. Details are discussed below.

Before continuing, the term "power integrated network" should be defined. Namely, the term "power integrated network" refers to a local network that transmits both power and data to member computer systems in the network. Such power may or may not be used by the member computer systems. Among other ways, the power and data may be transmitted on a single cable via different wires, or via the same wire. Illustrative power integrated networks include Power Ethernet networks, which implement the proposed IEEE 802.3af standard. Currently, this standard is in draft form and is expected to be completed and adopted sometime in late 2001. Computer systems utilizing this standard are capable of receiving power (e.g., about fourteen watts) and data from a computer cable across an IEEE DTE (data terminal equipment) through a MDI (media dependent interface) compliant port. It should be noted, however, that although Power Ethernet and this IEEE standard are discussed, various embodiments are not limited to such standard. Accordingly, various embodiments can be used on other types of networks that transmit both power and data.

It also should be noted that the term "data" is used herein to broadly represent any type of information that may be electronically transmitted across a network. Such information may include, among other things, information commonly referred to as audio, video, signaling, control, and data. In addition, instead of using the term "datum," the term "data" is used herein to represent both the singular and plural form of the term "datum."

Figure 1:
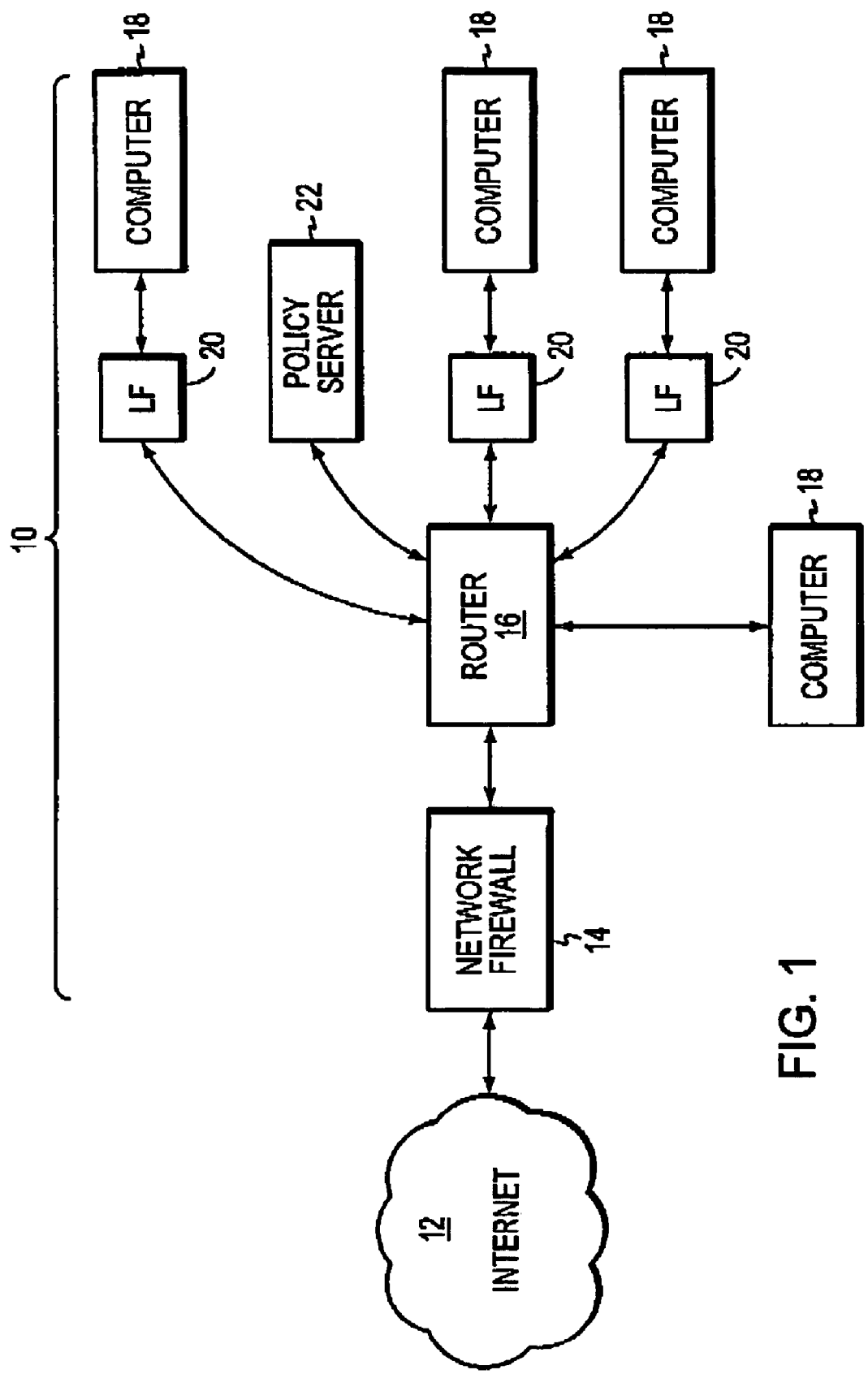
FIG. 1 schematically shows a network arrangement that may be used with illustrative embodiments of the invention.

FIG. 1 schematically shows an illustrative power integrated network 10 (hereinafter "network 10") coupled with a public network 12 (e.g., the Internet). The network 10 includes a network firewall 14 to control the flow of network traffic into and out of the network 10, a central router 16, and a plurality of coupled computer systems 18. The computer systems 18 may be any computer device, such as network appliances, personal computers, or servers. Various computer systems 18 each are coupled with a local firewall 20 that controls data traffic flow into and out of such computer systems 18. In the network 10 shown, one computer system 18 is not coupled with a local firewall 20, while three other computer systems 18 are coupled with a local firewall 20. Of course, in some embodiments, any number of computer systems 18 may be coupled with a local firewall 20.

The network 10 also includes a policy server 22 that cooperates with the local firewalls 20 and/or the network firewall 14 to respectively protect against unauthorized access into the computer systems 18 and network 10. In illustrative embodiments, the policy server 22 executes as a common open policy server ("COPS"). Of course, although desirable to use one, the network firewall 14 is not necessary. Accordingly, alternative embodiments do not include the network firewall 14.

Figure 2:
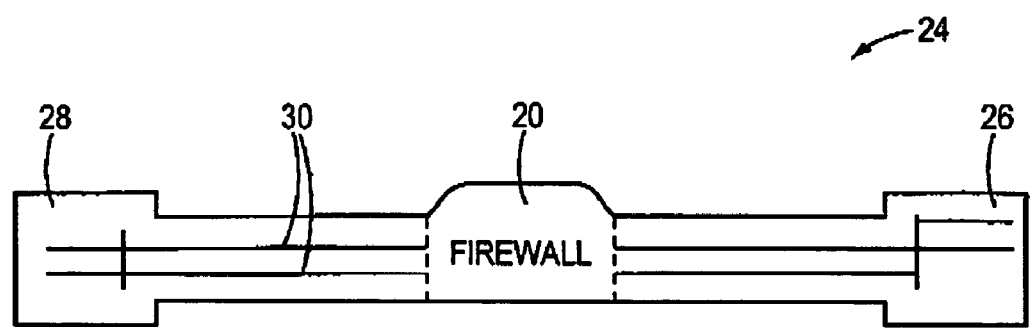
FIG. 2 schematically shows an illustrative integrated network cable that may have an internal firewall configured in accord with illustrative embodiments of the invention.

Each computer system 18 having a local firewall 20 preferably is electrically coupled with the router 16 via a computer cable having an integrated local firewall 20. Such computer cable may plug into a wall jack having an Ethernet plug that is connected to the router 16. FIG. 2 schematically shows such an illustrative computer cable 24. Specifically, the computer cable 24 includes a first connector 26 to couple with the computer system 18 (i.e., with the IEEE DTE power by MDI interface), a local firewall 20, and a second connector 28 to couple with the router 16 (e.g., via the above noted Ethernet plug). In illustrative embodiments, the computer system 18 being protected is in the same room as the wall jack. Accordingly, the firewall physically is located between such computer system 18 and the wall jack within the same room. In such case, when servicing is necessary, the firewall 20 may be physically unplugged in the same room as the computer system 18.

The computer cable 24 further includes a plurality of wires 30 that respectively carry data and power channels between the two connectors 26 and 28. In illustrative embodiments, the wires 30 are used in conformance with the Power Ethernet standard. For example, both power and data may be carried by a single wire, or carried separately by separate wires. The local firewall 20 thus is coupled with the power channel to derive its power, and to the data channel to both control data flow to and from its computer system 18, and to communicate with other devices in the network 10 (e.g., the policy server 22). The computer cable 24 also includes an outer jacket made of some flexible insulating material, such as PVC plastic or rubber. Of course, the outer jacket may be any material commonly used in the art to wrap around electrical wires.

In some embodiments, the local firewall 20 is not integrated into the computer cable 24. For example, the local firewall 20 may be directly coupled with a port on its protected computer system 18, or even within its protected computer system 18. When inside, the local firewall 20 may be a computer card with the attendant functionality and/or a software module that, when executing, performs the desired functions. For example, the local firewall 20 may be implemented on the network interface card (not shown) of the protected computer system 18. In such case, the local firewall 20 is powered from the power integrated network 10 and not by the computer system 18. This permits the firewall to be used to remotely query the computer system 18 to determine various information, such as whether the computer system 18 is then currently powered.

In still other embodiments, the local firewall 20 may be coupled with the Ethernet plug and thus, couple with its computer system 18 via a conventional computer cable. For example, the local firewall 20 may be a separate box that plugs into the Ethernet plug and a standard cable that connects the computer system 18 with the Ethernet plug. Variants of such embodiments also may be integrated directly into the Ethernet plug. Many embodiments of the invention, however, include a local firewall 20 between one member computer system 18 and such computer system's connection to the local network 10.

Figure 3:
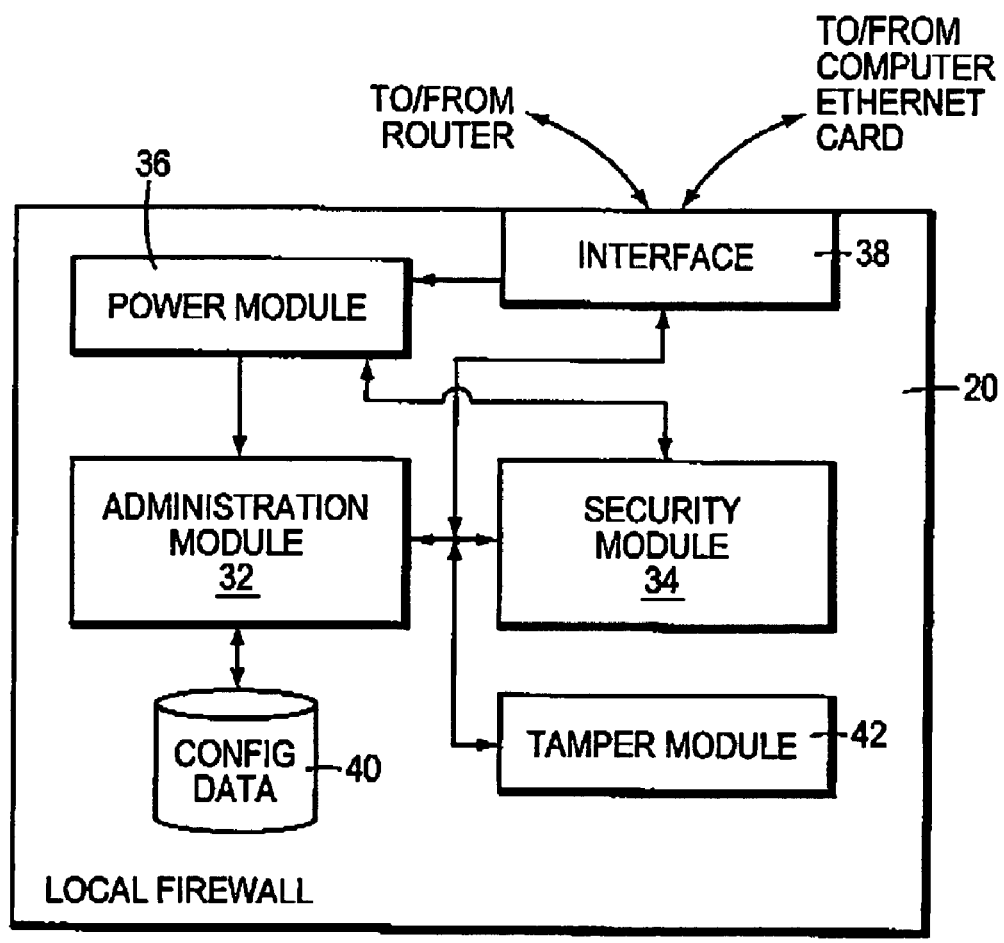
FIG. 3 schematically shows the firewall shown in FIGS. 1 and 2 in accordance with illustrative embodiments of the invention.

FIG. 3 schematically shows an illustrative local firewall 20 configured in accordance with illustrative embodiments of the invention. Among other things, the local firewall 20 includes an administration module 32 for ascertaining and maintaining firewall configuration data, and a security module 34 for controlling computer access based upon the configuration data maintained by the administration module 32. In illustrative embodiments, both the administration module 32 and security module 34 are software components executing on a microprocessor. Accordingly, the security module 34 may be firewall code (e.g., based on SHASTA firewall code, from Nortel Networks Limited of Brampton, Ontario) that controls data flow to/from the computer system 18.

To energize its components, the local firewall 20 includes a power module 36 for converting received power from the power integrated network 10. Since illustrative embodiments receive a constant DC power supply, the power module 36 preferably is a simple DC power circuit that adjusts the power to an appropriate level for the local firewall 20. For example, such circuit may be an up-converter or a down-converter (i.e., a buck converter). In alternative embodiments, the power converter can be configured in a more complex manner to include conventional rectification and other circuitry for converting an AC power signal.

The local firewall 20 also includes an interface 38 to communicate with other network devices (e.g., the router 16, the policy server 22, and the attached computer system 18), and configuration memory 40 for storing configuration data. Although only one is schematically shown, the interface 38 may be one single interface, or multiple interfaces. When data is received, the interface 38 forwards such data to the security module 34 for processing. The data then is forwarded to the computer system 18, via the interface 38, if the security module 34 determines that such data can be forwarded. Conversely, if the data is not permitted to pass to the computer system 18, then the security module 34 may forward a message to a network administrator (e.g., a server or other computer system 18) indicating that data has been rejected. The network administrator (which may be an actual person or automated software program) then may take appropriate action, such as disconnecting the network device requesting access. In other embodiments, the security module 34 may be preprogrammed to take some other action.

The local firewall 20 preferably executes program code by means of a relatively low power, high performance microprocessor. In illustrative embodiments, a CRUSO™ microprocessor using an operating system based upon the VXWORKS™ operating system is used for such purposes. The CRUSO™ microprocessor is distributed by Transmeta Corporation of Santa Clara, Calif. The VXWORKS™ operating system is distributed by Wind River Systems, Inc. of Alameda, Calif. Of course, use of these elements is not necessary since other processors and operating systems may be used. Discussion of these elements thus are for illustrative purposes only.

A tamper module 42 also may be included in the local firewall 20 to monitor power flow to the local firewall 20. Details of the tamper module 42 are discussed below. Other components not shown in the figures also may be included in the local firewall 20. For example, the local firewall 20 may include the IP stack, multicast functionality, a Java Virtual Machine ("JVM"), and other memory. Among other reasons, multicast functionality may be included to permit the local firewall 20 to be remotely controlled and/or configured. Those skilled in the art should understand that the local firewall 20 may include these and other elements for its use.

The local firewall 20 may be maintained in any conventional manner, such as by use of the Simple Network Management Protocol ("SNMP") on one or more computer systems 18 in the network 10. For example, SNMP may be used to poll, query, or otherwise control the local firewall 20.

In illustrative embodiments, the local firewall 20 must be configured prior to use. Configuration parameters may be derived from various sources. For example, the configuration memory 40 may have pre-loaded default configuration parameters. In addition, the network administrator, network firewall 14, or the computer system 18 being protected may include a configuration program that automatically or manually forwards configuration data to the local firewall 20.

Figure 4:
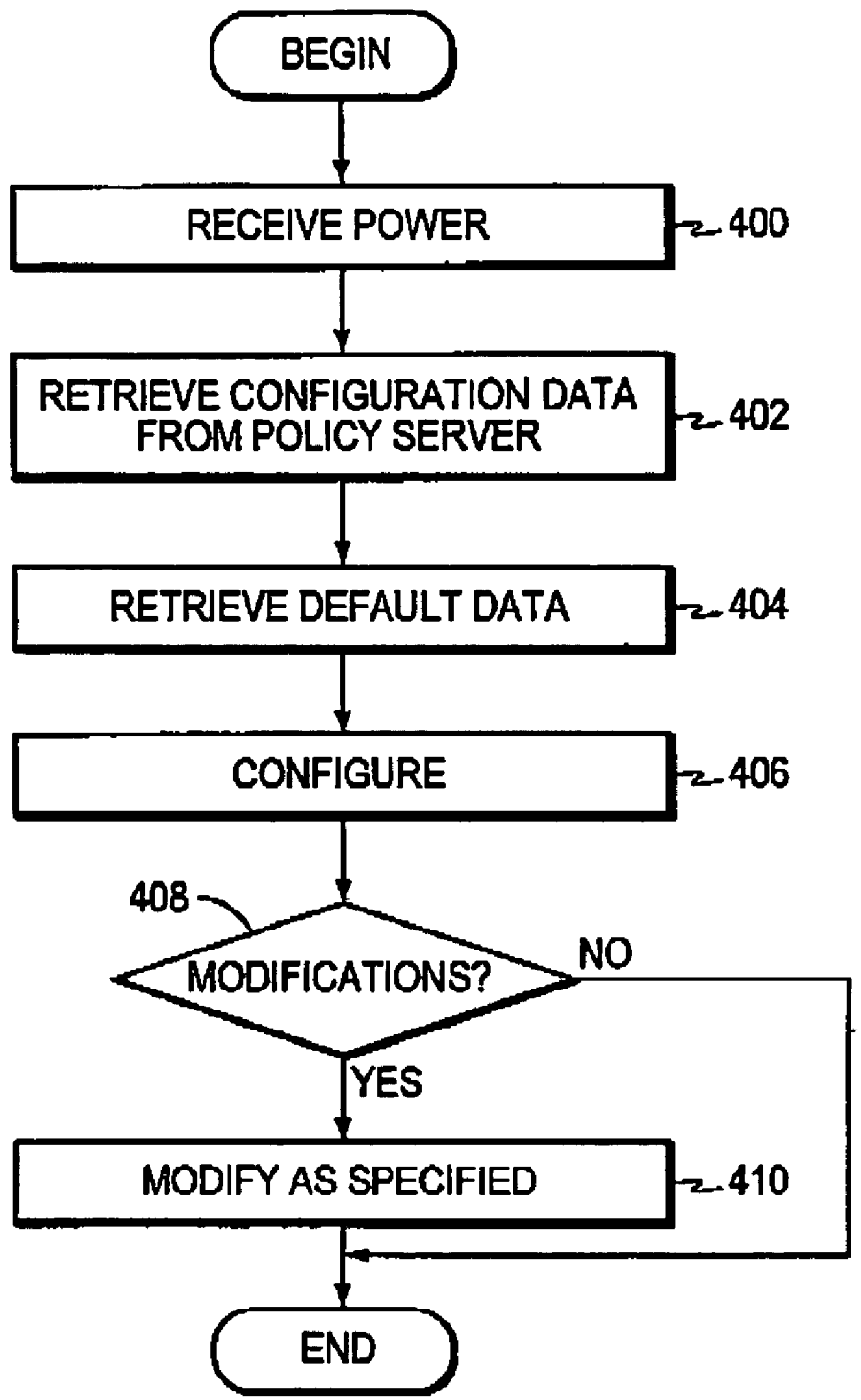
FIG. 4 shows a portion of an illustrative process of initializing the firewall shown in FIGS. 1–3.

FIG. 4 shows an illustrative process of configuring a local firewall 20 after it is connected to a computer system 18. The process begins at step 400, in which power is received by the local firewall 20 from the network 10. This power may be received via the power channel in the computer cable 24. Once converted to an appropriate level, the power is distributed to the elements in the local firewall 20, thus permitting the local firewall 20 to operate.

Once energized, the configuration data is retrieved by the administration module 32 from both the configuration memory 40 (i.e., the default configuration data) and the policy server 22 (steps 402 and 404). The local firewall 20 then is configured in accordance with the retrieved configuration data. At some later time, it is determined if the configuration parameters are to be modified (step 408). This indication may originate from the prior noted configuration program(s) executing on either the network administrator's computer system or the local computer system 18 being protected. If modifications are required, then the local firewall 20 is reconfigured as specified by the reconfiguration data (step 410).

It should be noted that many other configuration processes can be used. Accordingly, the illustrative process of FIG. 4 is but one of many potential methods of configuring the local firewall 20. In fact, various steps in the noted process can be executed in an order that is different than that described.

In addition to configuring itself, the local firewall 20 may act as a proxy for its protected local computer system 18 when such computer system 18 initially joins the network 10. To that end, the computer system 18 registers with the router 16 or other relevant network device in a conventional manner using the local firewall 20 as a proxy. Accordingly, the firewall may be considered to be transparent to the network 10.

In some embodiments, the local firewall 20 is configured to detect when someone has tampered with it. For example, to circumvent its security, someone may remove the local firewall 20 entirely, or replace the local firewall 20 with another local firewall 20 with other configuration data that permits access to the person tampering with it. Accordingly, in some embodiments, the local firewall 20 may include the tamper module 42 (noted above) to detect some of those events. In its simplest form, the tamper module 42 detects when an interruption of power to the local firewall 20 has occurred. The power interruption may be deemed to occur when power to a running local firewall 20 stops and then restarts. When the power interruption is temporary (e.g., someone may be attempting to physically tamper with the local firewall 20), the tamper module 42 may forward a tamper message to the network administrator indicating that there was a temporary power loss. The network administrator may act appropriately to the message, such as by checking the identity of the local firewall 20. In other embodiments, an impedance detector may be used to detect a change in impedance in the line. If such impedance change is detected, the network administrator may be notified.

In other embodiments, the network administrator monitors power levels of all local firewalls 20 by means of SNMP. Among other things, this monitoring may be a polling operation, periodic transmission of "keep-alive" messages from the firewalls 20, use of intrusion sensors, or maintenance of a circuit with the local firewall 20. If any power interruption is detected, then the network administrator may take appropriate action. Power interruption may be deemed to occur when a local firewall 20 has been removed entirely, or when a local firewall 20 has been removed and subsequently replaced with another local firewall 20. In fact, a power interruption may be deemed to occur when a local firewall 20 is removed and then re-coupled to the computer system 18.

In still other embodiments, the tamper module 42 or security module 34 may automatically forward a start-up message to the network administrator upon receipt of power during its start-up phase. When the start-up message is received, the network administrator may take appropriate action. For example, if the start-up message is received during a valid start-up that is approved by the network administrator, no action may be taken. Receipt of a start-up message after a local firewall 20 has been operating for some time, however, may indicate that such local firewall 20 is being tampered with, or is being replaced by another local firewall 20.

Some aspects of the invention may be implemented at least in part in any conventional computer programming language. For example, some embodiments may be implemented in a procedural programming language (e.g., "C") or an object oriented programming language (e.g., "C++"). Alternative embodiments of the invention may be implemented as preprogrammed hardware elements (e.g., application specific integrated circuits, FPGAs, and digital signal processors), or other related components.

Various components of the disclosed apparatus and method may be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over a network (e.g., the Internet or World Wide Web), and/or as a data signal. Of course, some embodiments of the invention may be implemented as a combination of both software (e.g., a computer program product) and hardware. Still other embodiments of the invention are implemented as entirely hardware, or entirely software (e.g., a computer program product).

Although various illustrative embodiments of the invention are disclosed below, it should be apparent to those skilled in the art that various changes and modifications can be made that will achieve some of the advantages of the invention without departing from the true scope of the invention. These and other obvious modifications are intended to be covered by the claims that follow:

I claim:

1. A computer cable for connecting a first computer system with a second computer system in a power integrated network, the cable comprising:
    a data channel for transmitting data between the first computer system and the second computer system;
    a power channel for transmitting power between the first computer system and the second computer system; and
    a firewall coupled with the data channel and the power channel, the firewall being energized by power received from the power channel.

2. The computer cable as defined by claim 1 wherein for bi-directional communication, the data channel includes at least one data wire.

3. The computer cable as defined by claim 1 wherein the power channel includes at least one power wire.

4. The computer cable as defined by claim 1 further comprising a power converter that converts power received from the power channel into a power level that is capable of energizing the firewall.

5. The computer cable as defined by claim 1 wherein the computer cable has two ends, the computer cable further comprising:
    a first coupler for coupling the first computer system with a first of the two ends of the computer cable; and
    a second coupler for coupling the second computer system with a second of the two ends of the computer cable.

6. The computer cable as defined by claim 1 further comprising a containment layer circumscribing the data channel, the firewall, and the power channel.

* * * * *